United States Patent

Mahmoud

[15] 3,638,040

[45] Jan. 25, 1972

[54] SYSTEM FOR ASYNCHRONOUS SWITCHING OF A LOAD FROM ONE POWER SOURCE TO ANOTHER

[72] Inventor: Aly A. Mahmoud, Oxnard, Calif.

[73] Assignee: The United States of America as represented by the Secretary of the Navy

[22] Filed: Aug. 5, 1970

[21] Appl. No.: 61,162

[52] U.S. Cl. ....................307/243, 307/43, 307/51, 307/85, 307/247, 307/257

[51] Int. Cl. ....................H03k 17/00

[58] Field of Search ............307/43, 51, 64, 80, 85, 241–243, 307/247, 257; 328/71, 79

[56] References Cited

UNITED STATES PATENTS

| | | | |
|---|---|---|---|
| 3,235,840 | 2/1966 | Sturm | 307/242 X |
| 3,078,378 | 2/1963 | Burley et al. | 307/243 X |
| 3,248,567 | 4/1966 | Quinlan | 307/247 X |
| 3,320,590 | 5/1967 | Rovell | 307/241 X |

*Primary Examiner*—John Zazworsky
*Attorney*—Richard S. Sciascia, Q. Baxter Warner and Howard J. Murray, Jr.

[57] ABSTRACT

A system employing power transistors for transferring a load between two independent power sources at any phase angle and in less than 20 microseconds. The system is unique in that it is extremely fast acting while at the same time does not require power source synchronization and produces no circulating currents during the switching interval.

4 Claims, 11 Drawing Figures

ASYNCHRONOUS, RESISTANCE LOAD

ASYNCHRONOUS, INDUCTANCE LOAD

ALY A. MAHMOUD
INVENTOR

BY Howard J. Murray, Jr. AGENT
Q. Baxter Warner
ATTORNEY

RESISTANCE LOAD WITH MICROSECOND
LOGIC CONTROL CIRCUITRY

INDUCTANCE LOAD WITH MICROSECOND
LOGIC CONTROL CIRCUITRY

SYSTEM FOR ASYNCHRONOUS SWITCHING OF A LOAD FROM ONE POWER SOURCE TO ANOTHER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The operation of certain types of electronic equipment such as calculators and computers is adversely affected by momentary voltage dips and discontinuities in the input powerline. To ensure the reliable functioning of such apparatus, conditioning circuits are utilized in spite of their expense and complexity. This also applies when critical equipment is to be rapidly switched from one power source to another, one presently available design incorporating silicon-controlled rectifiers (SCR's) which are effective when the load is to be transferred in no less than approximately 800 microseconds. However, a basic requirement for the operation of such arrangements is that the two power sources be synchronized for at least two-thirds of the power cycle to avoid heavy interpower circulating currents that can damage the SCR's. This expedient is costly and the presence of the synchronizing apparatus is always a potential source of malfunction.

Silicon-controlled rectifiers are known for their reliability; however, they cannot be turned off unless the current passing through them goes to zero, or is forced to zero by external circuitry. The use of such external circuitry appears to slow the fast-switching characteristics of the SCR's due to the circuits' finite time constants. Because of this zero-current turnoff characteristic of SCR's it is not possible to achieve high-speed, high-power (microsecond) power source transfer switching.

On the other hand, power transistors are also very reliable, and have the added feature that they can be turned off at any time by simply blocking the base current. It has accordingly been found that such power transistors can be employed for high-power asynchronous switching of a load from one source to another in as short a time as 20 microseconds or less.

SUMMARY OF THE INVENTION

The disclosure relates to a circuit for switching a load between two power sources at high speed. Each power source is connected to the load through a blocking bridge, and a power transistor is connected across each bridge between the two remaining terminals. When a power transistor is turned on, it completes a current path between the load and one of the power sources. To switch the load between two power sources, the conducting transistor is turned off and the nonconducting transistor is turned on. A logic module is provided for this purpose. The use of power transistors permits the switch to be made at any time during the cycle, and the switch may be made at high speeds since there is no need to force the current to zero as is the case when SCR's are used.

STATEMENT OF THE OBJECTS OF THE INVENTION

One object of the present invention, therefore, is to provide a system for transferring a load between two independent power sources at any phase angle and in less than 20 microseconds.

Another object of the invention is to provide a switching system of the type described that does not require power source synchronization and produces no circulating currents during the switching interval.

A further object of the invention is to provide a system of the type described which utilizes power transistors having high reliability and long operating life.

Another object of the invention is to determine the effects of high-speed asynchronous switching on various types of load circuits so that a decision can be reached as to whether synchronization of the individual power sources is necessary or if such synchronization can be dispensed with.

Other objects, advantages and novel features of the invention will become apparent from the following detailed description of the invention when considered in conjunction with the accompanying drawings wherein:

DESCRIPTION OF THE PREFERRED EMBODIMENT

In a system of the type exemplified by the present invention, power transistors are utilized as static switches. These components possess a high resistance in their nonconduction state (OFF mode) and a very low resistance when conducting (ON mode). They are turned on and off by controlling their base current. In their ON state, the transistor must operate in the saturation region to prevent an excessive loss of power.

For the purposes of the present concept, the primary factors that should be considered for selection of a transistor suitable for high-power, high-speed switching applications may be summarized as follows:

1. Turning OFF ($T_{off}$) and turning ON ($T_{on}$) time. In order to achieve efficient high-speed switching, both $T_{off}$ and $T_{on}$ time must be as short as possible. A shorter $T_{on}$ and $T_{off}$ time will also reduce transistor power dissipation. Transistors with a $T_{on}$ or $T_{off}$ time not greater than 5 $\mu$sec should be selected. A 5-$\mu$sec switching time is considered to be adequate.

2. Open circuit collector to emitter voltage ($V_{ceo}$). The $V_{ceo}$ chosen must be greater than the peak of the sustained AC input voltage. This peak input voltage may reach 340 volts for a 120-volt power source when the two power sources to be switched are 180° out of phase. Therefore, to operate in the transistor safe region, a $V_{ceo}$ greater than 400 volts should be selected.

3. Collector-emitter voltage drop in the conduction (ON mode) $V_{ce(Sat)}$. The value of the $V_{ce(Sat)}$ should be selected as small as the state of the art permits. Minimizing $V_{ce(Sat)}$ results in reducing the power dissipation and the voltage drop across the transistor, thus increasing the transistor's switching efficiency.

4. Collector current ($I_c$). The value of the collector current must be greater than the peak AC load current ($I_p$). To prolong the lifetime of a transistor, derating is a very significant factor. When $I_p$=½ $I_c$ is selected the transistor failure rate is reduced substantially.

5. Transistor current-gain ($I_c/I_b$). Transistors with high current gains are highly desirable since they offer a small control base current ($I_b$). Small values of $I_b$ at full load current minimize base power dissipation and simplify the control circuitry. Transistors with a minimum current gain of 10 at full load should be selected.

6. Temperature effects and variations in transistor parameters. To reduce thermal effects and to minimize changes in transistor parameters, transistors must be mounted properly in suitable heat sinks. The heat sinks should be selected to dissipate the maximum power of $V_{ceo}$ X $I_p$.

Figure 1:
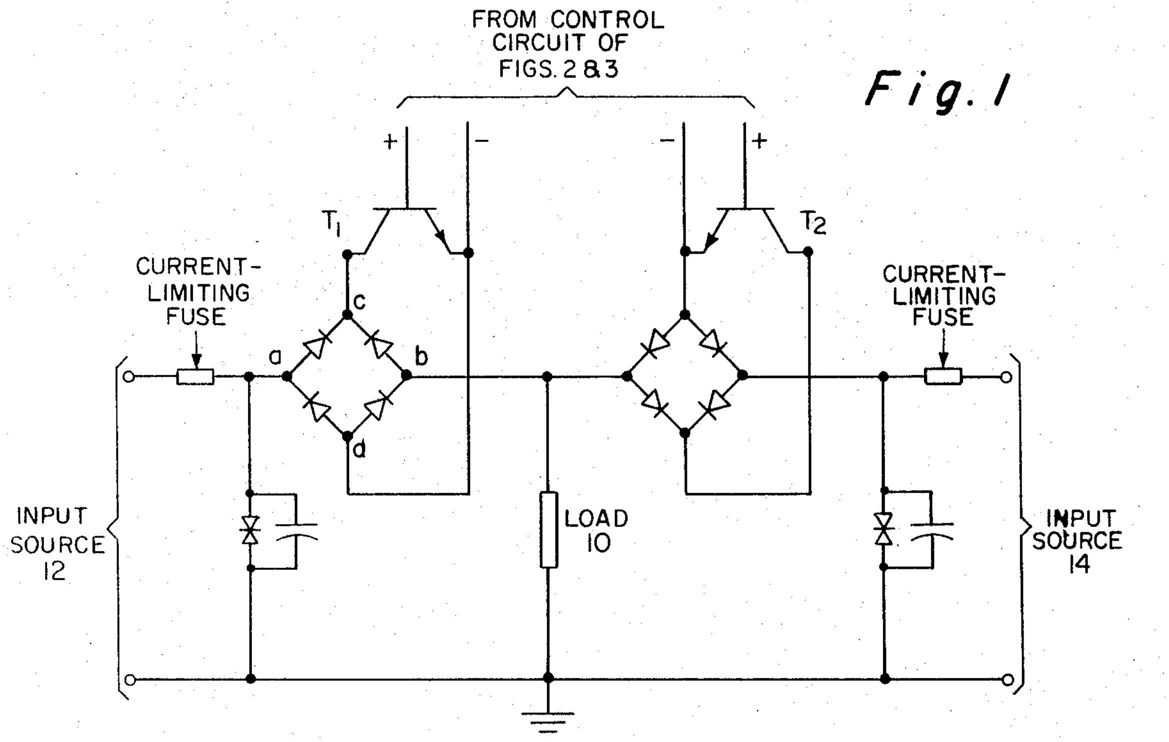
FIG. 1 of the drawings is a circuit diagram, partly in schematic form, of a system designed in accordance with a preferred embodiment of the present invention for asynchronously switching a load between two independent power sources in a time period of a few microseconds.
Figure 2:
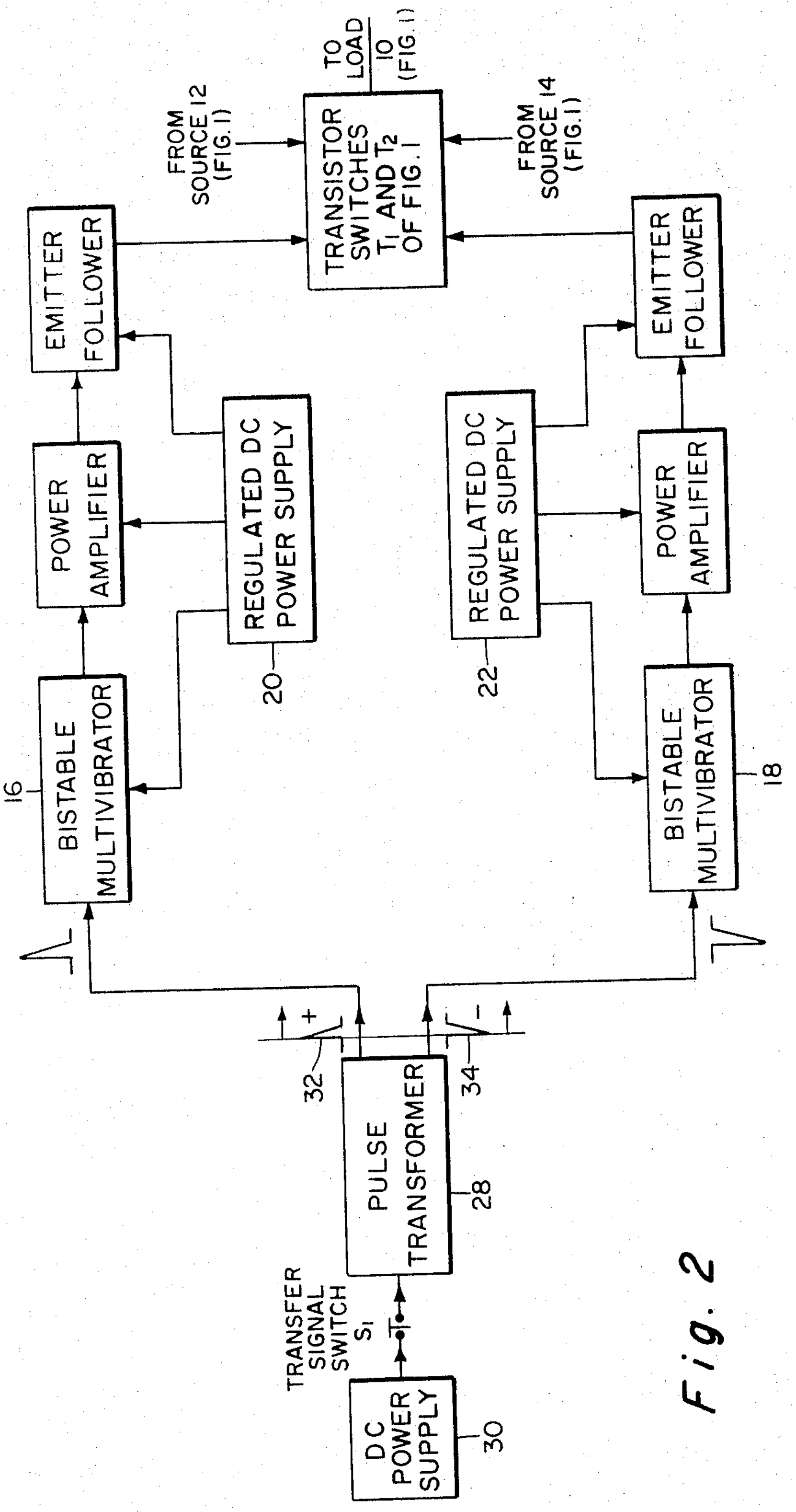
FIG. 2 is a block diagram of the logic control circuitry for the switching system of FIG. 1.
Figure 3:
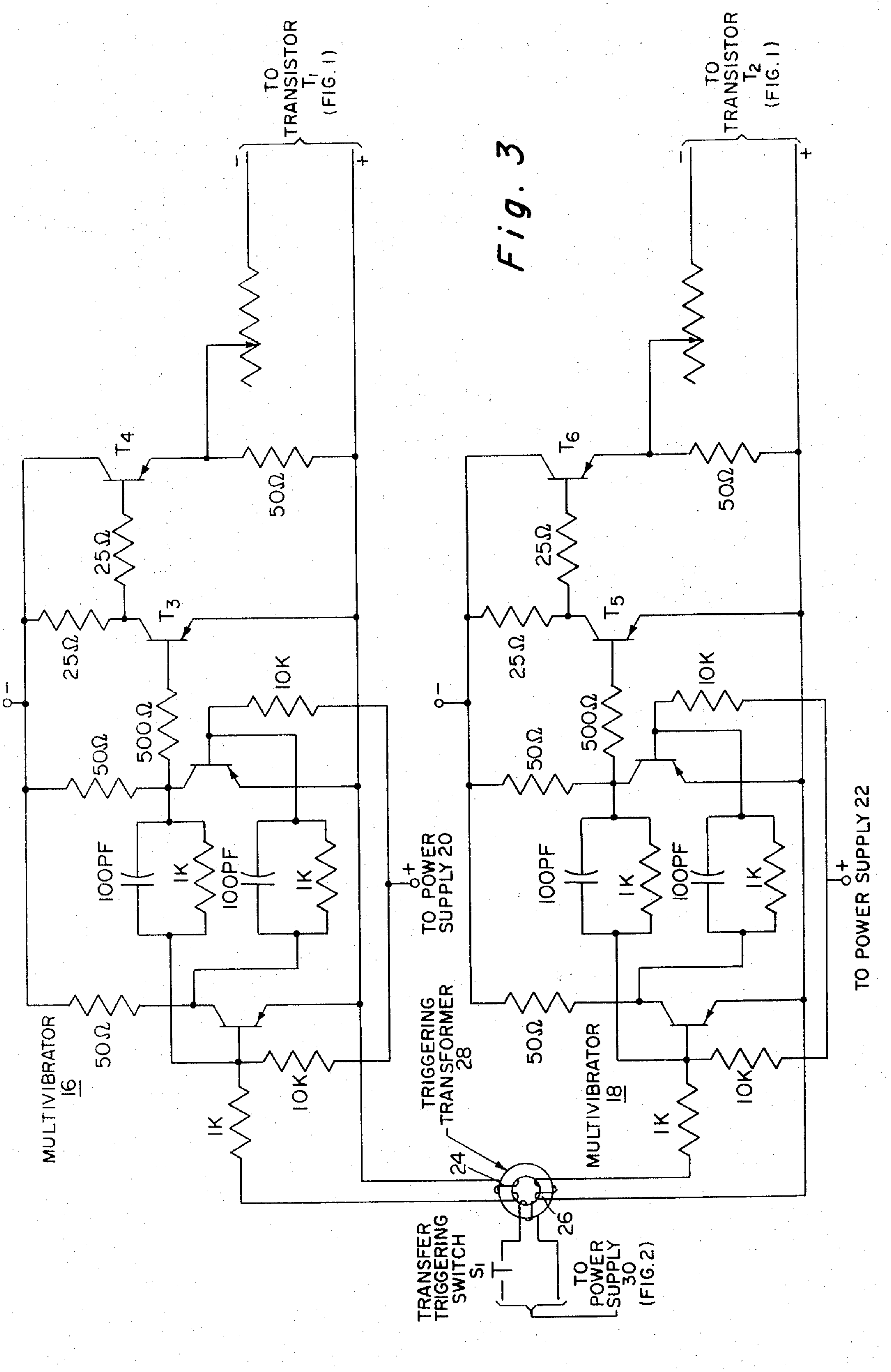
FIG. 3 is a detailed schematic diagram of certain portions of the control circuitry of FIG. 2.
Figure 5A:
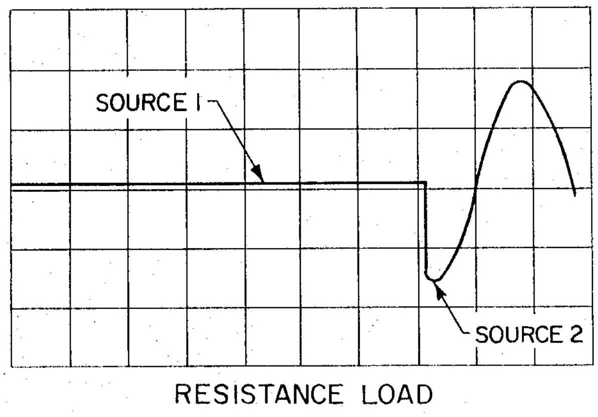
FIGS. 5*a*–5*d* are a set of voltage waveforms illustrating one aspect of the operation of the present invention.
Figure 5B:
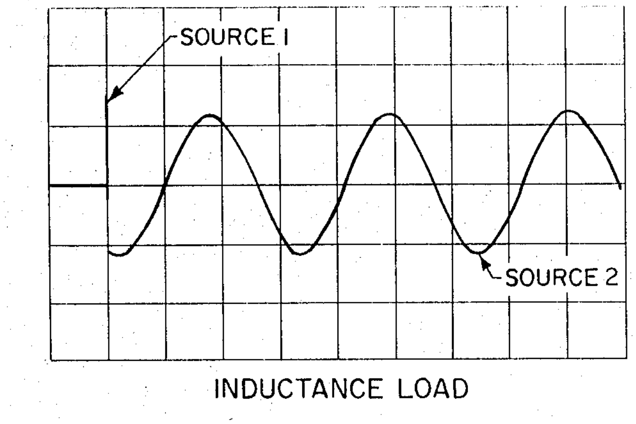
Figure 5C:
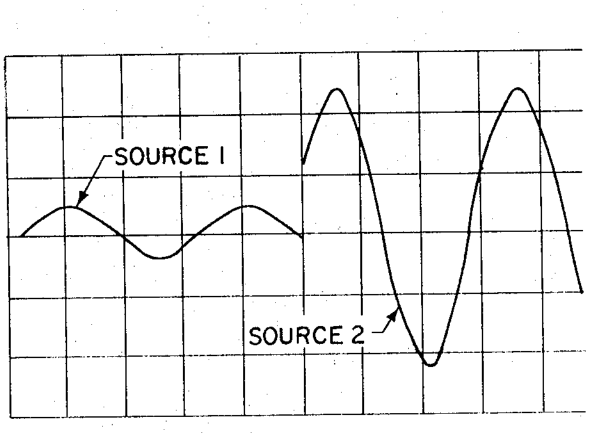
Figure 5D:
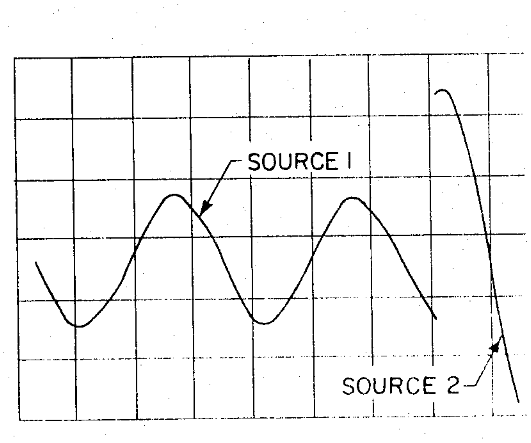

In FIGS. 1 through 3 of the drawings is illustrated a preferred form of asynchronous power source transfer switching system designed in accordance with the present invention. Although the illustrated system is of the single-phase, 120-volt, 1 kw. type, this is of course purely exemplary of the principles herein disclosed. Referring now to FIG. 1, it will be seen to include a pair of high-voltage, high-current power transistors $T_1$ and $T_2$. Each of these transistors acts as a high-speed static switch that selectively connects and disconnects a load 10 to or from one of the input power sources 12 and 14. In other words, the load 10 can be supplied by either of the two power sources 12 and 14 by controlling the base currents of transistors $T_1$ and $T_2$. Turning $T_1$ off and $T_2$ on will disconnect the load 10 from source 12 and connect it to source 14; similarly, turning $T_2$ off and $T_1$ on will disconnect the load 10 from source 14 and connect it to source 12.

Since transistors are basically unidirectional switching elements, each transistor switch is connected across a high-current four-diode bridge, as shown. The bridge arrangement allows the use of one transistor switch in bidirectional switching. While the voltage across the bridge input terminals *a* and *b* varies sinusoidally (bidirectionally), the voltage at terminals *c* and *d* is unidirectional. This is necessary since the transistor collector junction must be reverse biased at all times. The transistor in this case acts as a unidirectional switch between terminals *c* and *d*. In the ON mode the transistor acts as a short circuit between terminals *c* and *d*, thus connecting the full cycle of the power source to the load through the four-diode bridge; and in the OFF mode it disconnects terminals *c* and *d*, thereby disconnecting the load from the power source.

In order to control the transistor switches and hence the transfer of load 10, the circuit of FIGS. 2 and 3 has been designed. It is a logic arrangement providing complete electrical isolation between the respective bases of $T_1$ and $T_2$, and thus eliminates the possibility of currents circulating between the two transistor switch networks. Electrical isolation is necessary since the base of $T_1$ will have a potential different from the base of $T_2$ at all times. The magnitude of this difference is a function of the voltage levels of the two-power sources 12 and 14 as well as their phase relationship.

The maximum potential difference ($V_{max}$), which determines the degree of isolation, is obtained for various voltage levels and phase angles from the following analysis:

Let power source 12 have a voltage of $V_1 \sin(\omega t)$ and power source 14 a voltage of $V_2 \sin(\omega t+\theta)$, where $\theta$ is the phase angle between the two power sources.

If both power sources are synchronized ($\theta=0$) and equal in magnitude ($V_1=V_2$), then the potential difference between the two transistor switch bases ($V_{b_1b_2}$) will be zero and no isolation is necessary. However, if they are synchronized and different in magnitude ($V_1 \neq V_2$), then $V_{b_1b_2}$ will be:

$$V_{b_1b_2}=V_1 \sin(\omega t) - V_2 \sin(\omega t) \qquad (1)$$

Equation 1 approaches the maximum value of $V_1$ or $-V_2$ when $V_2=0$ or $V_1=0$, respectively. Therefore, the isolation required between the two bases and their associated circuitry should be designed to withstand the greater of $V_1$ or $-V_2$.

If the two power sources are not synchronized, then $V_{b_1b_2}$ will be:

$$V_{b_1b_2}=V_1 \sin(\omega t) - V_2 \sin(\omega t+\theta) \qquad (2)$$

Equation 2 has the maximum value of $(V_1+V_2)$ when $\theta=180°$, that is, when the two power sources are 180° out of phase. Thus, isolation to withstand at least 340 volts is necessary for the single-phase, 120-volt, asynchronous switching system herein set forth. FIG. 3 of the drawings illustrates one possible isolation arrangement, which will be described hereinafter.

To achieve high-speed power source transfer switching in the microsecond range, the logic control circuitry of FIGS. 2 and 3 was designed. This circuitry consists mainly of two bistable multivibrators 16 and 18 acting together as a selector switch between the two power sources 12 and 14. The block diagram of these multivibrators and their associated circuitry is shown in FIG. 2.

To guarantee isolation of the two power sources (which is necessary for asynchronous switching), both multivibrators are supplied by separate DC-regulated power supplies 20 and 22, respectively. Both multivibrators are triggered simultaneously by two separate pulses, equal in magnitude but opposite in direction. These pulses are obtained from two well-insulated secondary coils 24 and 26 (FIG. 3) of a toroidal pulse transformer 28, the primary of which is connected to a DC source 30 in series with a transfer triggering switch ($S_1$). When $S_1$ is turned on, a flux is established in the toroidal core of the pulse transformer, producing two simultaneous positive and negative pulses across its two separate secondary coils 24 and 26. The positive pulse 32 is utilized to control multivibrator 16 and turn on the main transistor switch $T_1$, and the negative pulse 34 is utilized to control multivibrator 18 and turn off the main transistor switch $T_2$. Turning off the transfer triggering switch $S_1$ reverses the polarity of the two pulses 32 and 34, thus turning off transistor $T_1$ while turning on transistor $T_2$. By this arrangement, high-speed switching between the two independent power sources 12 and 14 is accomplished at any phase angle.

In the circuit of FIG. 3, the initial gain in both multivibrators 16 and 18 is adjusted to produce opposite outputs. Therefore, if the output of multivibrator 16 is at a high level, the output of multivibrator 18 is at a low level, and vice versa. This adjustment is necessary to avoid the possibility of turning the two main transistor switches on at the same time, thus causing heavy interpower currents, or off at the same time, thus disconnecting the load 10 from both power sources.

The application of an input positive pulse 32 to multivibrator 16 changes the level of its output ($0_1$) from high (1 volt) to low (zero volts). This change from the 1 level to the zero level is amplified by transistor $T_3$, the output of which is utilized to turn off power transistor $T_4$. Turning off transistor $T_4$ will disconnect the DC base current of the main transistor switch $T_1$, causing it to turn off, thus disconnecting the load 10 from power source 12. At the same time, the negative pulse 34 changes the output level ($0_2$) of multivibrator 18 from the zero level to the 1 level. The change is then amplified through transistor $T_5$ and is utilized in turning on power transistor $T_6$, thus allowing a DC base current through the main transistor switch $T_2$. This base current will turn on transistor $T_2$, thus connecting the load 10 to power source 14, and completing the load transfer cycle. When the polarity of the input pulses is reversed, the above process is reversed and the load is transferred from power source 14 back to power source 12. The time elapsed in transferring the load by the above circuitry is 20 $\mu$sec or less.

Since transistors $T_1$ and $T_2$ are sensitive to transients, protective measures should be taken to prevent damage thereto. For example, thyrectors with a breakdown voltage below that of the transistors can be employed. Also, current limiting fuses are desirable in order to restrict the transistor current to that of the full load. Such safety measures, however, are well known to those in the art.

The DC power supplies 20, 22 and 30 must be regulated, since the transistor base currents vary from no load to full load during the switching process. Separate supplies are needed to effect the necessary transistor isolation, as above discussed.

Figure 4A:
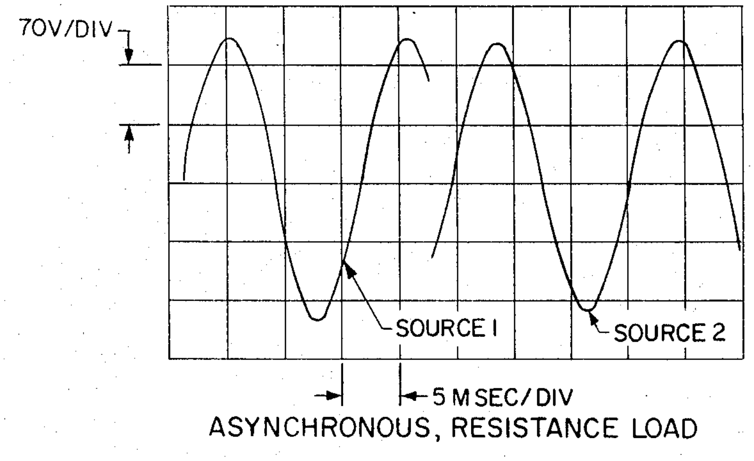
FIGS. 4*a* and 4*b* are a set of typical load voltage waveforms developed during operation of the circuit of FIGS. 2 and 3.
Figure 4B:
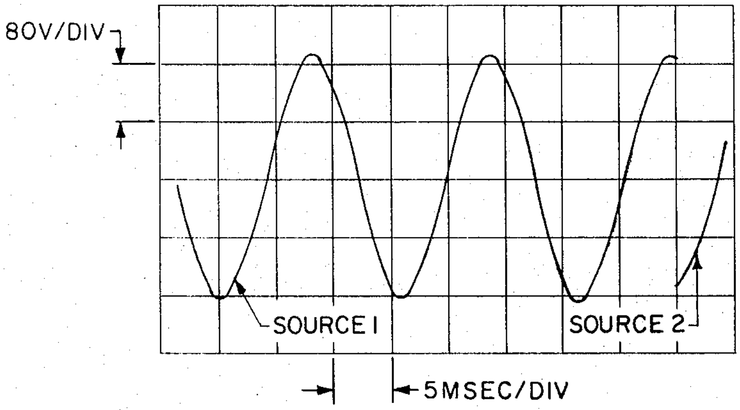

Performance of a switching system utilizing the arrangement of FIGS. 1 through 3 is graphically illustrated in FIG. 4 of the drawings, wherein typical load voltage waveforms developed during transfer of a load between two asynchronous power sources are set forth, the load being either resistive (a) or of an inductive nature (b).

If the voltage levels of the two power sources are different, the system of FIGS. 1 through 3 is still effective to carry out the transfer operation. FIG. 5 depicts such a switching operation for both resistance and inductance loads, waveforms (c) and (d) being for asynchronous sources.

Figure 6A:
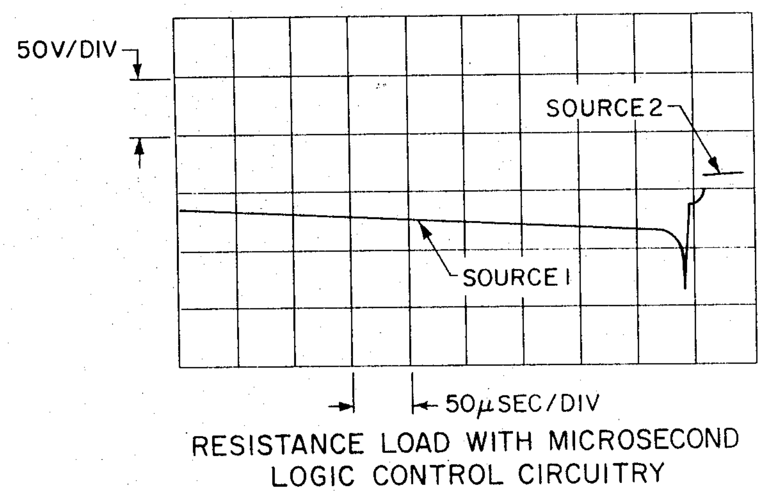
FIGS. 6*a* and 6*b* are a set of waveforms showing typical times required for switchover from one source to another when utilizing the invention circuitry.
Figure 6B:
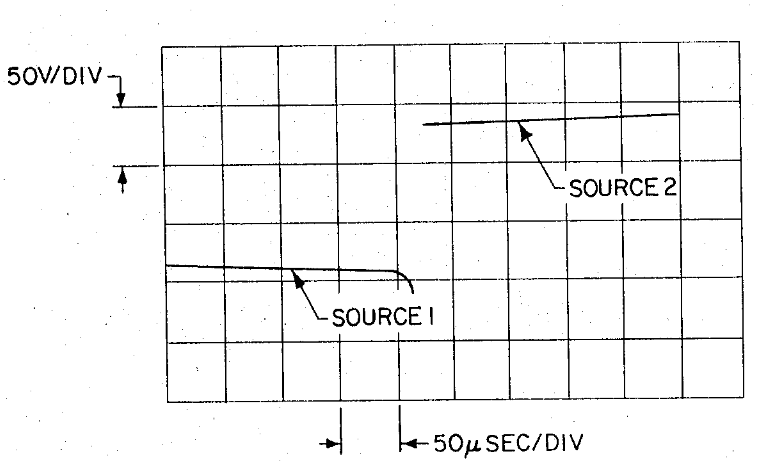

The total switchover time from one power source to another when using the system of FIGS. 1 through 3 is as low as 20 $\mu$sec, as brought out by the waveform of FIG. 6, wherein (a) is for a resistance load and (b) for an inductance load.

While the invention has been described in connection with asynchronous power sources, it should be understood that the microsecond logic control circuitry herein set forth is equally applicable to the fast switching of synchronous power sources. While presently available systems require a time period of at least 2 milliseconds for this operation, use of the present invention reduces the switching interval to 20 microseconds or even less without introducing any appreciable distortion into the waveform.

Obviously many modifications and variations of the present invention are possible in the light of the above teachings. It is therefore to be understood that within the scope of the appended claims the invention may be practiced otherwise than as specifically described.

I claim:

1. In a system for transferring a load between two independent power sources at any phase angle and in a period as short as 20 $\mu$sec without producing circulating currents in the transfer system and without requiring any degree of synchronization between the two power sources, said system comprising:

a pair of power transistors;

circuit means for connecting said load to one of said asynchronous power sources through one of said pair of transistors and to the other of said power sources through the other of said pair of transistors; and means for controlling the operation of said transistors so that only one of said pair is conductive at any instant of time, to connect its associated power source to said load;

said controlling means being effective to switch said pair of transistors between conductive and nonconductive states in a period as short as 20 $\mu$sec and without producing circulating currents in the transfer system:

said means for controlling the operation of said transistors including a pair of bistable multivibrators respectively associated with said pair of transistors;

means for simultaneously generating a pair of pulses of opposite polarity; and means for respectively applying the pulses so generated to said pair of multivibrators to concurrently trigger the latter.

2. The combination of claim 1 in which the respective outputs of said pair of multivibrators are applied to said pair of transistors so that one of the latter switches from a conductive to a nonconductive state while the other concurrently switches from a nonconductive to a conductive state.

3. The combination of claim 2 in which the means for simultaneously generating a pair of pulses of opposite polarity includes a transformer having a pair of oppositely wound secondary coils, the said pair of pulses being respectively derived from said pair of secondary coils.

4. The combination of claim 3 in which each of said pair of multivibrators is energized from a separate source of operating potential in order to preclude the production of circulating currents in the transfer system.

* * * * *